United States Patent
Huelsen et al.

(10) Patent No.: US 12,172,503 B2
(45) Date of Patent: Dec. 24, 2024

(54) ROOF MODULE FOR A MOTOR VEHICLE COMPRISING A ROOF SKIN FORMING A ROOF COVER

(71) Applicant: Webasto SE, Stockdorf (DE)

(72) Inventors: Michael Huelsen, Stockdorf (DE); Dirk Legler, Stockdorf (DE); Michael Deppe, Stockdorf (DE); Johannes Thannheimer, Stockdorf (DE); Thomas Rudolph, Stockdorf (DE); Thomas Lindner, Munich (DE)

(73) Assignee: WEBASTO SE, Stockdorf (DE)

( * ) Notice: Subject to any disclaimer, the term of this patent is extended or adjusted under 35 U.S.C. 154(b) by 138 days.

(21) Appl. No.: 17/633,435

(22) PCT Filed: Aug. 11, 2020

(86) PCT No.: PCT/EP2020/072481
§ 371 (c)(1),
(2) Date: Feb. 7, 2022

(87) PCT Pub. No.: WO2021/032533
PCT Pub. Date: Feb. 25, 2021

(65) Prior Publication Data
US 2022/0289006 A1   Sep. 15, 2022

(30) Foreign Application Priority Data
Aug. 19, 2019 (DE) .................. 10 2019 122 214.1

(51) Int. Cl.
*B60R 11/04* (2006.01)
*B60J 7/00* (2006.01)
*B60Q 1/26* (2006.01)

(52) U.S. Cl.
CPC .............. *B60J 7/00* (2013.01); *B60Q 1/2611* (2013.01); *B60R 11/04* (2013.01)

(58) Field of Classification Search
CPC .... B60R 11/04; B60R 11/0247; B60Q 1/2611
(Continued)

(56) References Cited

U.S. PATENT DOCUMENTS 9,802,656 B1 * 10/2017 Williams ................ G01S 17/89
9,963,018 B2 *  5/2018 Williams ............ B60R 13/0212
(Continued)

FOREIGN PATENT DOCUMENTS

JP          61277206        8/1986
JP       2015-107764 A     6/2015

OTHER PUBLICATIONS

Translation of International Search Report and Written Opinion for PCT/EP2020/072481 mailed Mar. 3, 2022, in English (6 pages).
(Continued)

*Primary Examiner* — Jason S Daniels
(74) *Attorney, Agent, or Firm* — Fitch, Even, Tabin & Flannery, LLP

(57) ABSTRACT

A roof module for connection to a motor vehicle having a transparent solid roof portion, which forms a see-through roof area and which is immobile relative to the vehicle body when the roof module is in the installed position, and/or a roof opening system having a mobile lid element, by means of which a roof opening can be opened or closed at will, and a closed roof skin, which forms the see-through roof area and/or is adjacent to the roof opening and forms a roof cover outside of the see-through roof area and/or the roof opening. At least one sensor module can be provided having at least one environment sensor for detecting a vehicle environment and is disposed outside of the see-through roof area and/or the roof opening and is covered by the roof skin.

12 Claims, 4 Drawing Sheets

(58) Field of Classification Search
USPC ............. 296/210, 201, 3; 248/237, 542, 904
See application file for complete search history.

(56) References Cited

U.S. PATENT DOCUMENTS

| | | | | |
|---|---|---|---|---|
| 10,099,630 | B1* | 10/2018 | Krishnan | G01S 7/4813 |
| 10,766,430 | B2* | 9/2020 | Frederick | B60R 11/00 |
| 11,731,705 | B2* | 8/2023 | Friedrich | B60R 16/02 |
| | | | | 296/210 |
| 2008/0185876 | A1* | 8/2008 | Vogt | B60R 9/04 |
| | | | | 296/210 |
| 2017/0120803 | A1* | 5/2017 | Kentley | B60W 10/04 |
| 2017/0291544 | A1* | 10/2017 | Ishihara | G06F 3/013 |
| 2017/0305242 | A1* | 10/2017 | Gallagher | B62D 25/04 |
| 2017/0369106 | A1 | 12/2017 | Williams et al. | |
| 2018/0011173 | A1 | 1/2018 | Newman et al. | |
| 2018/0302088 | A1* | 10/2018 | Majkowski | B60Q 3/74 |
| 2019/0001891 | A1* | 1/2019 | Suzuki | B60R 1/00 |
| 2019/0003895 | A1 | 1/2019 | Krishnan et al. | |
| 2019/0176717 | A1 | 6/2019 | Gomes et al. | |
| 2019/0202371 | A1 | 7/2019 | Frederick et al. | |

OTHER PUBLICATIONS

International Search Report for PCT/EP2020/072481 mailed Nov. 10, 2020, in English and German (6 pages).
Office Action issued against corresponding Korean Patent Application No. 10-2022-7006381; mailed Sep. 22, 2023; In Korean with English Translation (13 pages). Note: cited Japanese reference No. 2015-107764 previously cited in a prior IDS.

* cited by examiner

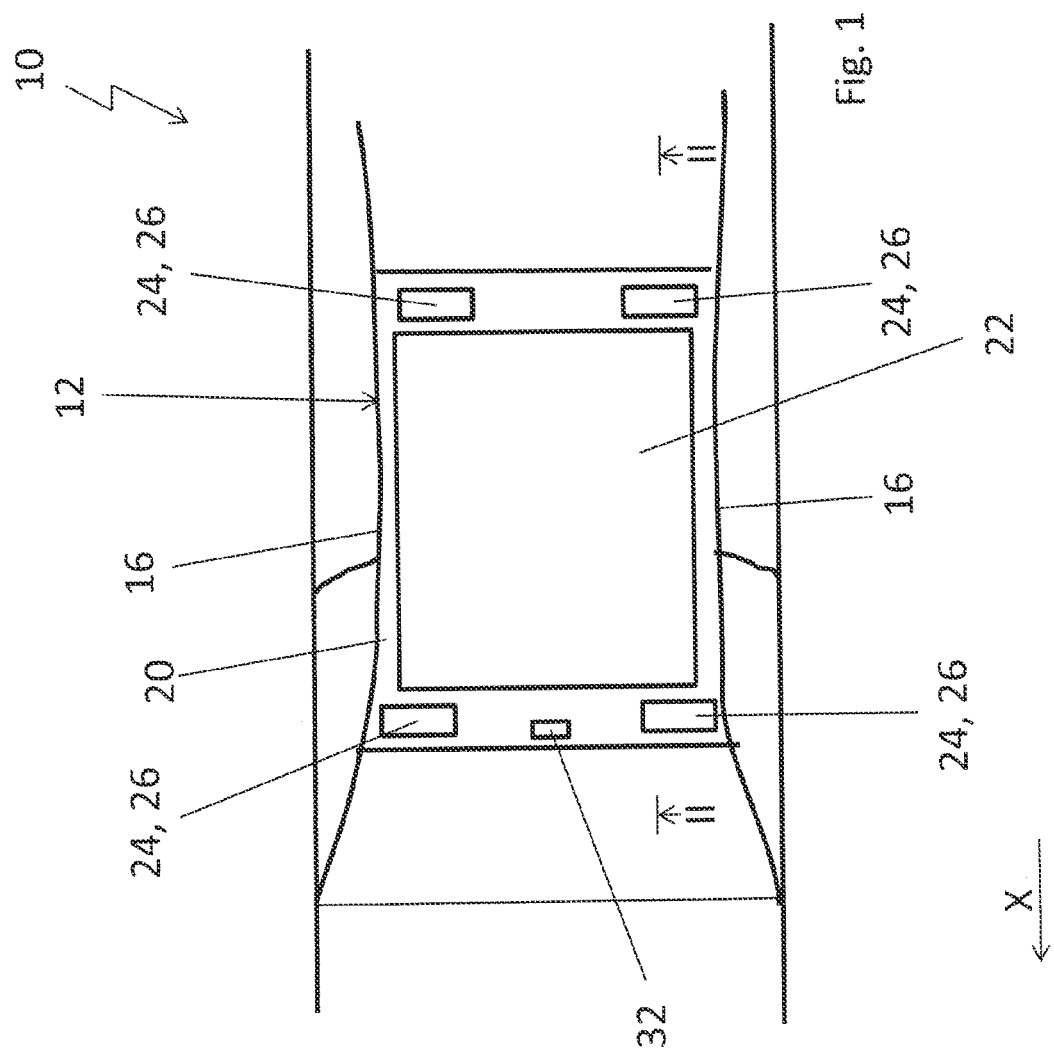

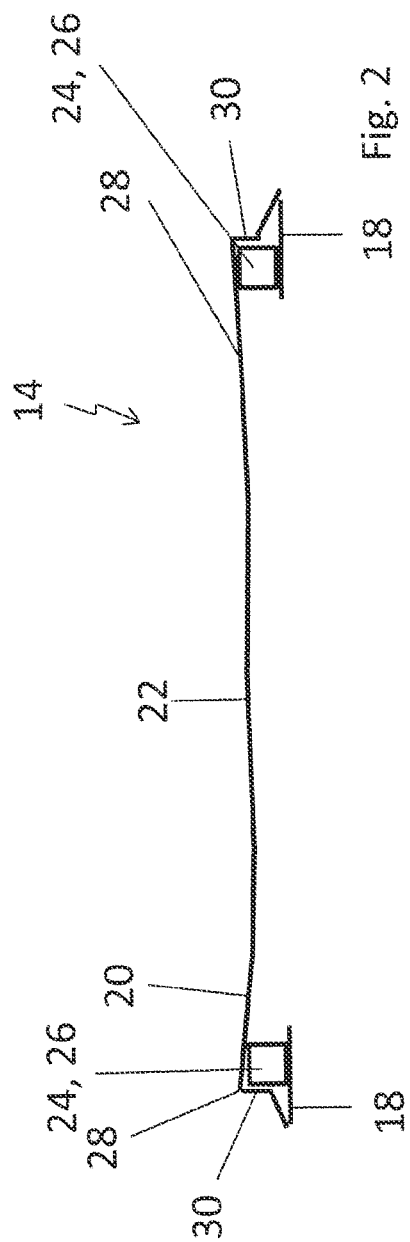
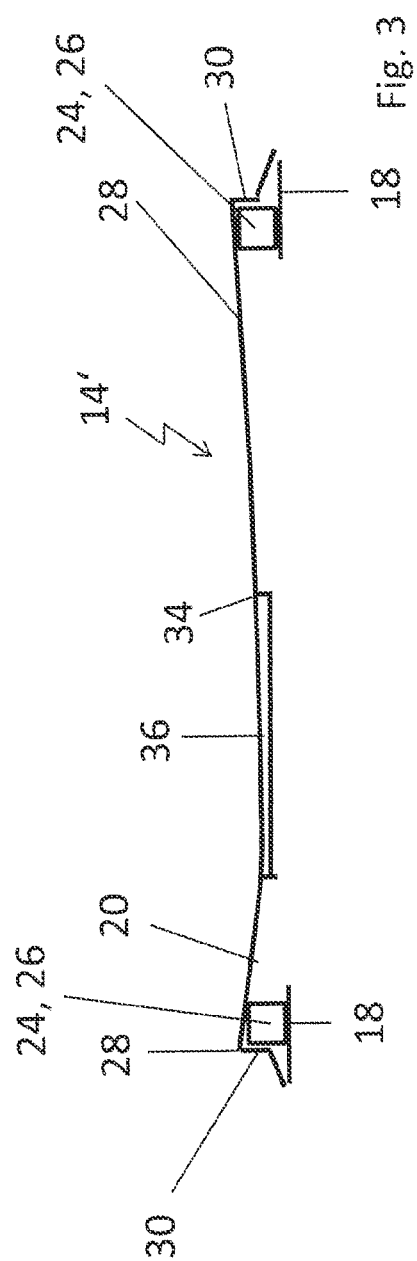

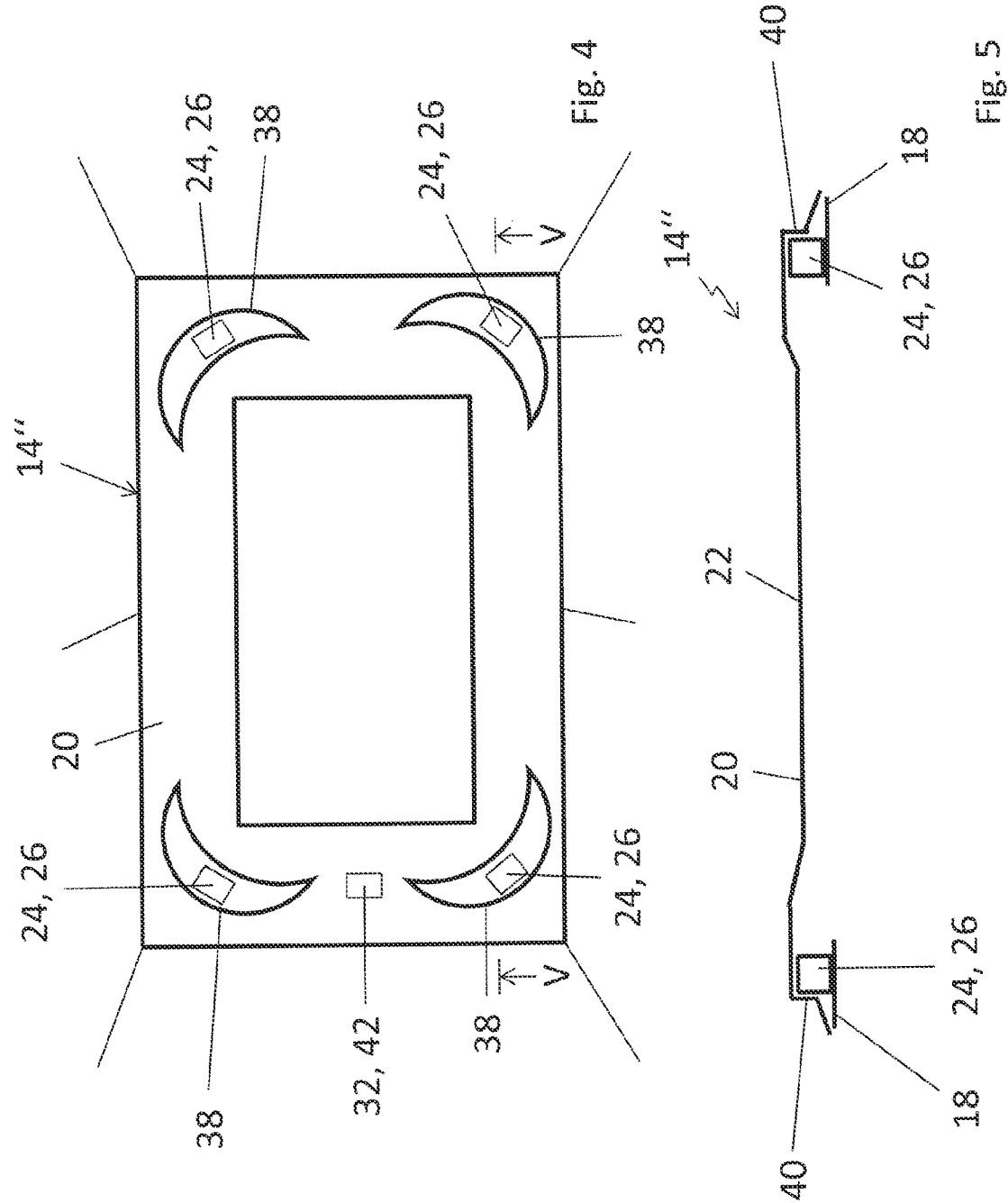

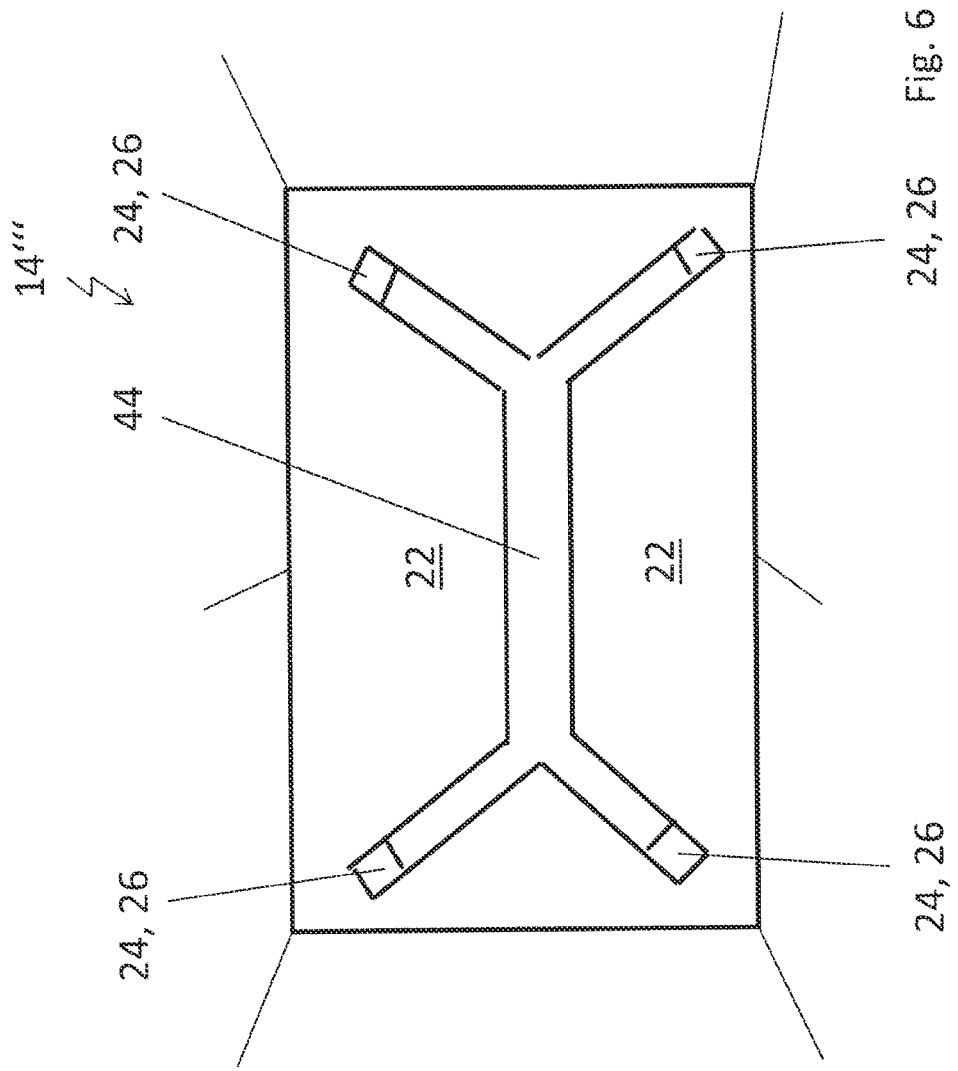

ROOF MODULE FOR A MOTOR VEHICLE COMPRISING A ROOF SKIN FORMING A ROOF COVER

CROSS-REFERENCE TO RELATED APPLICATION

This application is a U.S. national phase application filed under 35 U.S.C. § 371 of International Application No. PCT/EP2020/072481, filed Aug. 11, 2020, designating the United States, which claims priority from German Patent Application Number 10 2019 122 214.1 filed on Aug. 19, 2019, which is hereby incorporated herein by reference in its entirety for all purposes.

FIELD

The invention relates to a roof module for a motor vehicle, in particular for a passenger car, the roof module comprising the features of the preamble of claim 1.

BACKGROUND

A roof module of this kind is known from practice and constitutes, in particular in a passenger car, a vehicle roof which can be placed on a vehicle body, which forms a vehicle body shell, as a separate component. Known roof modules can be configured as a solid roof which has a transparent portion for forming a panoramic roof, said transparent portion forming a see-through roof area. The solid roof portion is fixed, i.e., immobile, relative to the vehicle body when the roof module is in the installed position, i.e., in the state in which the roof module is connected to the vehicle body. Alternatively or additionally, the roof module can have a roof opening system which comprises a mobile lid element by means of which a roof opening can be opened or closed at will. The roof module further comprises a roof skin, which forms the outer roof skin or the outer visible surface and which is partially transparent for forming the see-through roof area and which can extend as far as to the roof opening. Outside of the see-through roof area or outside of the roof opening, the roof skin forms a roof cover, which covers the support elements and other functional elements of the roof module which could disturb the visual appearance.

Furthermore, it is known for sensor modules enabling autonomous or semi-autonomous driving of the motor vehicle in question to be disposed on vehicle roofs. In known motor vehicles, these sensor modules, which have environment sensors for monitoring and detecting the vehicle surroundings, are also attached to the vehicle roof since the vehicle roof is typically the highest point of a vehicle, from where the vehicle environment is easily visible. To date, the sensor modules have been configured as attachments placed on top of the vehicle in question. However, this leads to a visual appearance which typically does not meet customer demands.

SUMMARY

The object of the invention is to provide a roof module for a motor vehicle, in particular for a passenger car, which is suitable for integrated use on an autonomously or semi-autonomously driving motor vehicle while meeting high visual demands.

According to the invention, this object is attained by the roof module having the features of claim 1.

So the roof module according to the invention comprises a sensor module which is provided with an environment sensor for detecting a vehicle environment and which is to disposed outside of a see-through roof area and/or a roof opening, where it is covered by the roof skin which also forms the see-through roof area and/or is adjacent to the roof opening.

In an integrated manner, the roof module configured according to the invention therefore constitutes a vehicle roof in which the components required for autonomous or semi-autonomous driving of the vehicle in question are disposed in such a manner that a transparent solid roof portion and/or a roof opening can be realized which can be opened or closed at will by means of a mobile lid element of a roof opening system. The invention provides a sensor roof or a roof sensor module (RSM) which both enables the vehicle in question to drive autonomously or semi-autonomously and is provided with a transparent solid roof portion and/or an openable roof portion, the roof skin also covering the at least one sensor module in a visually pleasing manner. In autonomous driving mode, the vehicle in question drives on its own, means required therefor being integrated in the roof module according to the invention. In semi-autonomous driving mode, the roof module according to the invention provides driver assistance systems.

The roof module according to the invention can form a structural unit in which all functional elements are integrated and which can be connected to a vehicle body or a vehicle body shell so as to form the vehicle roof. It can be configured for use in a passenger car or in a utility vehicle.

The sensor module of the roof module according to the invention is preferably disposed in a corner area of the roof module so that the see-through roof area or the roof opening closable by means of the lid element can be as large as possible. So the roof skin which forms the see-through roof area and/or is adjacent to the roof opening extends into the respective corner area of the roof module in this embodiment with the result that the sensor module disposed there is covered by the roof skin at the top, i.e., on its upper side.

Alternatively, the sensor module can also be disposed on the roof module at the front or at the rear and centrally relative to the vertical longitudinal center plane of the roof and can be covered by the roof skin at the top in this area. It is also conceivable for the sensor module to be disposed in an edge area of the roof module disposed laterally relative to a longitudinal center plane of the vehicle.

The roof skin can be continuous in the area of the sensor module and be transparent to a signal used by the environment sensor in a respective area in order to adequately protect the sensor module from environmental conditions. Preferably, this area is transparent to electromagnetic radiation in a wavelength range between 200 nm and 2000 nm and in particular also to radar radiation.

The environment sensor of the sensor module can basically configured in various ways and can in particular comprise a Lidar sensor, a radar sensor, an optical sensor, such as a camera, and/or the like. Lidar sensors operate in a wavelength range of 905 nm or about 1550 nm. So the material of the roof skin which is transparent to the environment sensor has to be selected as a function of the wavelength used.

In a specific embodiment of the roof module according to the invention, the roof skin forms a step on whose face a see-through area, which has to be transparent to the signal used by the environment sensor, is formed for the environment sensor. A step of this kind can be integrated in a roof skin of a closed design in a visually pleasing manner.

A roof frame, which is preferably an integral part of the roof module and to which the roof skin is also attached, can be provided for mounting and precisely positioning the sensor module. The roof frame forms a support structure of the roof module.

In a specific embodiment of the roof module according to the invention, which has a transparent solid roof portion formed by the roof skin, the roof skin is a single element, which means that the area of the roof skin covering the sensor module and the area of the roof skin forming the transparent roof portion are formed by the same component. It is also conceivable for the closed roof skin to be composed of multiple adjacent roof skin elements whose outer sides are in particular aligned, i.e., flush with each other.

In an advantageous embodiment of the roof module according to the invention, the lid element is disposed above the sensor module when in an open position so as to not affect the function of the sensor module irrespective of the position of the lid element. The lid element is thus always located outside of the field of view of the environment sensor of the sensor module.

A preferred embodiment of the roof module according to the invention comprises four sensor modules, each of which is disposed in a corner area of the roof module and covered by the roof skin. The four sensor modules disposed in the corner areas of the roof module allow the vehicle environment to be monitored at least almost entirely. Alternatively, only two sensor modules are disposed in the two front corner areas or in the two rear corner areas. Additionally or alternatively, a sensor module can be disposed in each lateral edge area. It is also conceivable for a sensor module to be disposed in a front or rear edge area.

In addition to covering the sensor module at the top, the roof skin preferably also covers other functional elements which are disposed in the roof module for autonomous or semi-autonomous driving of the vehicle in question and which can comprise an antenna element, electronic elements and/or thermal management elements.

Furthermore, a signal light by means of which an operating mode of the vehicle in question can be indicated and which is disposed at the front or at the rear and which is covered by the roof skin at least at the top can be integrated in the roof module according to the invention. The signal light is in particular what is referred to as an ADS (autonomous drive signal) light, which indicates whether the vehicle in question is in an autonomous driving mode. Other means of communication for the communication of the vehicle with other road users, such as a loudspeaker and/or a microphone, can also be integrated in the roof module according to the invention.

In a specific embodiment of the roof module according to the invention, the roof skin covering the sensor module forms an opaque web which centrally extends in the longitudinal direction of the roof and separates two see-through roof areas from each other. Thus, a separate see-through roof area is associated with each of the right and left vehicle sides. The opaque web can also extend in the transverse direction of the roof. The web can basically serve to guide and accommodate cables and/or lines. To this end, the web can be provided with at least one channel or duct and/or with appropriate fastening means.

Other advantages and advantageous configurations of the subject matter of the invention are apparent from the description, the drawing, and the claims.

BRIEF DESCRIPTIONS OF THE DRAWINGS

Examples of configurations of a roof module according to the invention are schematically illustrated in the drawing and will be explained in more detail in the following description.

FIG. 1 is a top view of a motor vehicle comprising a roof module according to the invention;

FIG. 2 is a longitudinal section through the roof module of FIG. 1 along line II-II in FIG. 1;

FIG. 3 is a longitudinal section corresponding to FIG. 2 through a second embodiment of a roof module;

FIG. 4 is a top view of a third embodiment of a roof module according to the invention;

FIG. 5 is a longitudinal section through the roof module of FIG. 4 along line V-V in FIG. 4; and FIG. 6 is a top view of a fourth embodiment of a roof module according to the invention.

DETAILED DESCRIPTION

FIG. 1 shows a motor vehicle 10, which is configured as a passenger car and comprises a vehicle body, which constitutes a body shell and on top of which a roof module 14 is placed. Roof module 14 thus forms a vehicle roof limited by lateral longitudinal roof beams 16, which are part of vehicle body 12. An arrow X indicates a forward direction of travel of motor vehicle 10.

Roof module 14, which is illustrated on its own in FIG. 2, is a roof sensor module (RSM) equipped with devices enabling motor vehicle 10 to drive autonomously.

Roof module 14 comprises a roof frame 18, which forms a support structure and constitutes an interface of roof module 14 to vehicle body 12. Moreover, roof module 14 comprises a roof skin 20, which forms a transparent solid roof portion 22 in a central area, through which light can enter a vehicle interior. Roof skin 20 is fixed to roof frame 18.

In each of its four corner areas, roof module 14 has a sensor module 24 which is provided with an environment sensor 26 by means of which the vehicle surroundings can be detected in order to implement autonomous driving of motor vehicle 10. A current traffic situation can be determined by evaluating the measuring signals of environment sensors 26 by means of a controller of motor vehicle 10 so that motor vehicle 10 can autonomously adapt to the traffic situation and behave accordingly. Sensor modules 24 are each disposed on roof frame 18.

Environment sensors 26 of sensor modules 24 can each be configured in various ways and comprise a Lidar sensor, a radar sensor, a camera (mono/multi/multi-focal and/or stereo camera) and/or any other suitable sensor, for example.

Roof skin 20 which forms transparent solid roof portion 22 extends into the corner areas of roof module 14, which means that sensor modules 24 are covered by roof skin 20. In the case at hand, roof skin 20 is a single element.

In order to enable environment sensors 26 of sensor modules 24 to monitor the vehicle environment, roof skin 20 forms a step 28 in the area of each of sensor modules 24, a see-through roof area for respective environment sensor 26 being formed on a face 30 of step 28. So the faces of steps 28 are transparent to the wavelengths used by environment sensors 26. These wavelengths are in a range between 200 nm and 2000 nm, for example. If a Lidar sensor is employed as the environment sensor, a wavelength of 905 nm and/or a wavelength of 1550 nm is used in particular.

A steeply dropping roof surface forming a see-through area for the respective environment sensor can be formed in the area of the respective sensor module instead of a step.

Since sensor modules 24 are disposed in the corner areas, they are far apart from each other and disposed outside of the see-through area formed by the transparent solid roof portion. So sensor modules 24 also have a large distance from each other, which is at least about 90 cm in the transverse direction of the roof and at least about 120 cm in the longitudinal direction of the roof.

Additionally, roof module 14 has what is referred to as an ADS light 32 in a front area centrally relative to a vertical longitudinal center plane of the roof, ADS light 32 being able to inform the vehicle surroundings of whether motor vehicle 10 is in an autonomous driving mode.

FIG. 3 shows a roof module 14', which is an alternative embodiment and differs from the roof module illustrated in FIGS. 1 and 2 in that it forms a roof opening 34 which can be closed or at least partially opened at will by means of a lid element 36, which is part of a roof opening system. A roof skin 20 is adjacent to roof opening 34, said roof skin 20 covering sensor modules 24 in the corner areas of roof module 14' in the same manner as the roof skin of the embodiment of FIGS. 1 and 2, said sensor modules 24 each comprising an environment sensor 26 and being disposed on a roof frame 18, which is also part of roof module 14' and forms an interface to a vehicle body.

Lid element 36 is a lid element of a spoiler roof and is disposed above sensor modules 24 disposed at the rear and outside of their field of view when in its fully open position. The field of view of environment sensors 26 of these sensor modules 24 is not shaded this open position of lid element 36 either.

The roof module of FIG. 3 is otherwise configured in the same manner as the roof module of FIGS. 1 and 2, which is why a further detailed description is omitted for the sake of clarity.

In another embodiment, which is not illustrated, roof skin 20 can also be composed of multiple parts, a transparent solid roof portion being formed by a roof skin element and the portion adjacent thereto being formed by another roof skin element, which extends across sensor modules 24.

FIGS. 4 and 5 show a roof module 14'', which is another embodiment of a roof module according to the invention and in which roof skin 20 has a cover element or a cover portion in each corner area of roof module 14'', said cover element or cover portion being sickle shaped in a top view and being disposed above a respective sensor module 24 with an environment sensor 26. Sickle-shaped cover portions 38 each have an outer arc-shaped face 40, which forms a see-through area for respective environment sensor 26, i.e., it is transparent to the wavelength used by respective environment sensor 26.

Between the two front cover portions 38, roof skin 20 forms a light field 42 for an ADS light, which provides the vehicle surroundings with information regarding the operating mode of motor vehicle 10, which is configured as an autonomously driving vehicle.

Additionally, a sensor module comprising a camera or the like can be disposed behind a dropping roof surface in the area of the ADS light.

Cover portions 38 limit a central roof portion 22, which is also formed by roof skin 20 and is at least partially transparent.

FIG. 6 is a top view of a roof module 14''', which comprises two transparent solid roof portions 22 disposed on either side of a center web 44 extending in the longitudinal direction of the vehicle, center web 44 being formed by a roof skin 20, as are transparent solid roof portions 22. As in the embodiments described above, roof skin 20 extends into the corner areas of roof module 14''' and covers a sensor module 24, which comprises an environment sensor 26 in the form of a Lidar sensor or the like, in each corner area. Cables and line are accommodated in center web 44, for which a channel/duct and/or fastening means can be provided.

Roof skin 20 which forms solid roof portions 22 and the cover, which in turn forms both center web 44 and the covers of sensor modules 24, can be configured as a single-component or multi-component injection-molded part and be transparent to the wavelength used by environment sensors 26 in the area of each of sensor modules 24. The roof skin can also comprise glass elements.

The invention claimed is:

1. A roof module for a motor vehicle, for being connected to a vehicle body, the roof module being a structural unit which can be connected to the vehicle body so as to form a vehicle roof, the roof module comprising:
a transparent solid roof portion, which forms a see-through roof area and which is immobile relative to the vehicle body when the roof module is in the installed position, and/or
a roof opening system comprising a mobile lid element, by means of which a roof opening can be opened or closed at will, and a closed roof skin, which forms the see-through roof area and/or is adjacent to the roof opening and forms a roof cover located outside of the see-through roof area and/or the roof opening,
the roof module comprising at least one sensor module comprises at least one environment sensor for detecting a vehicle environment and being disposed outside of the see-through roof area and/or the roof opening and being covered by the roof skin,
wherein the sensor module is disposed on a roof frame, which is an integral part of the roof module and to which the roof skin is attached,
wherein the sensor module is disposed on the roof frame, and
the roof frame forms a support structure of the roof module and is an interface between the roof module and the vehicle body.

2. The roof module according to claim 1, wherein the sensor module is disposed in a corner area and/or in a lateral edge area relative to a vertical longitudinal center plane of the roof or in a front area or a rear area of the roof module in the center of the vehicle.

3. The roof module according to claim 1, wherein at least part of the roof skin is transparent to a signal used by the environment sensor.

4. The roof module according to claim 1, wherein the roof skin forms a step, on whose face a see-through portion for the environment sensor is formed, or a prominence, on which a see-through portion for the environment sensor is formed, or a roof slope, which has a see-through portion for the environment sensor.

5. The roof module according to claim 1, wherein a roof skin portion covering the sensor module is produced in one piece with the transparent solid roof portion.

6. A roof module for a motor vehicle, for being connected to a vehicle body, the roof module being a structural unit which can be connected to a vehicle body so as to form a vehicle roof, the roof module comprising:

a transparent solid roof portion, which forms a see-through roof area and which is immobile relative to the vehicle body when the roof module is in the installed position, and/or a roof opening system comprising a mobile lid element, by means of which a roof opening can be opened or closed at will, and a closed roof skin, which forms the see-through roof area and/or is adjacent to the roof opening and forms a roof cover located outside of the see-through roof area and/or the roof opening, the roof module comprising at least one sensor module comprises at least one environment sensor for detecting a vehicle environment and being disposed outside of the see-through roof area and/or the roof opening and being covered by the roof skin, wherein the sensor module is disposed on a roof frame, which is an integral part of the roof module and to which the roof skin is attached, and wherein the sensor module is disposed on the roof frame, wherein the lid element is disposed above the sensor module when in an open position.

7. The roof module according to claim 1, wherein multiple sensor modules are covered by the roof skin, in particular four sensor modules each being disposed in a corner area of the roof module or two sensor modules each being disposed in a front or rear corner area of the roof module and/or two sensor modules each being disposed in a lateral edge area of the roof module and/or two sensor modules each being disposed centrally in an edge area of the roof module extending in the trans-verse direction of the roof.

8. The roof module according to claim 1, wherein the roof skin covers functional elements for autonomous driving of the vehicle, said functional elements comprising an antenna element, electronic elements and/or thermal management elements.

9. The roof module according to claim 1, wherein a signal light by means of which an operating mode of the vehicle is indicated and which is disposed at the front or at the rear and is covered by the roof skin at least at the top.

10. The roof module according to claim 1, further comprising an acoustic signaling device and/or a microphone for the communication of the vehicle with the vehicle surroundings when in an autonomous driving mode.

11. The roof module according to claim 1, wherein the roof skin covering the sensor module forms an opaque web centrally extending in the longitudinal direction of the roof or in the transverse direction of the roof and separating two see-through roof areas from each other.

12. A motor vehicle comprising a roof module according to claim 1.

* * * * *